US010766005B2

(12) United States Patent
Small et al.

(10) Patent No.: US 10,766,005 B2
(45) Date of Patent: Sep. 8, 2020

(54) NANOSTRUCTURED POLYELECTROLYTES FOR ION-SELECTIVE MEMBRANES

(71) Applicant: National Technology & Engineering Solutions of Sandia, LLC, Albuquerque, NM (US)

(72) Inventors: Leo J. Small, Albuquerque, NM (US); Stephen Percival, Albuquerque, NM (US); Erik David Spoerke, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 101 days.

(21) Appl. No.: 16/128,081

(22) Filed: Sep. 11, 2018

(65) Prior Publication Data

US 2020/0078736 A1    Mar. 12, 2020

(51) Int. Cl.
| | |
|---|---|
| *B01D 61/44* | (2006.01) |
| *C08J 5/22* | (2006.01) |
| *C08J 3/24* | (2006.01) |
| *B01J 43/00* | (2006.01) |
| *B01D 61/46* | (2006.01) |
| *B01D 69/02* | (2006.01) |
| *B01D 71/60* | (2006.01) |
| *B01D 71/40* | (2006.01) |
| *B01D 69/12* | (2006.01) |

(52) U.S. Cl.
CPC ......... *B01D 61/445* (2013.01); *B01D 61/46* (2013.01); *B01D 69/02* (2013.01); *B01D 69/125* (2013.01); *B01D 71/40* (2013.01); *B01D 71/60* (2013.01); *B01J 43/00* (2013.01); *C08J 3/245* (2013.01); *C08J 5/2287* (2013.01); *B01D 2325/14* (2013.01); *B01D 2325/16* (2013.01); *B01D 2325/42* (2013.01); *C08J 2333/02* (2013.01); *C08J 2379/02* (2013.01)

(58) Field of Classification Search
CPC ...... B01D 61/445; B01D 61/46; B01D 69/02; B01D 69/125; B01D 71/60; B01D 71/40; C08J 5/2287; C08J 3/245; B01J 43/00
USPC .......................................... 521/27
See application file for complete search history.

(56) References Cited

U.S. PATENT DOCUMENTS

2015/0218017 A1\*  8/2015  McGinnis ............ B01D 61/002
                                                                210/654

OTHER PUBLICATIONS

Rajesh et al. "Polyacrylonitrile nanofiber membranes modified with ionically crosslinked polyelectrolyte multilayers for the separation of ionic impurities", Nanoscale (2016), 8(43), pp. 18376-18389. (Year: 2016).\*
Tang et al. "Rapid Assembly of Polyelectrolyte Multilayer Membranes Using an Automatic Spray System", American Institute of Chemical Engineers AIChE Journal, (2013), vol. 59, No. 1, pp. 250-257. (Year: 2013).\*
Percival et al. "Polyelectrolyte layer-by-layer deposition on nanoporous supports for ion selective membranes", RSC Adv., 2018, 8, pp. 32992-32999. (Year: 2018).\*
Hagen, D. A. et al., "Shift-Time Polyelectrolyte Multilayer Assembly: Fast Film Growth and High Gas Barrier with Fewer Layers by Adjusting Deposition Time", ACS Macro Lett., 2014, pp. 663-666, vol. 3.
Cho, C. et al., "Combined Ionic and Hydrogen Bonding in Polymer Multilayer Thin Film for High Gas Barrier and Stretchiness", Macromolecules, 2015, pp. 5723-5729, vol. 48.
Alem, H. et al., "Layer-by-Layer Assembly of Polyelectrolytes in Nanopores", Macromolecules, 2007, pp. 3366-3372, vol. 40.
Roy, C. J. et al., "Growth Mechanism of Confined Polyelectrolyte Multilayers in Nanoporous Templates", Langmuir, 2010, pp. 3350-3355, vol. 26.
Carrillo, J-M.Y. et al., "Layer-by-Layer Assembly of Polyelectrolyte Chains and Nanoparticles on Nanoporous Substrates: Molecular Dynamics Simulations", Langmuir, 2012, pp. 1531-1538, vol. 28.
Raoufi, M. et al., "Pushing the Size Limits in the Replication of Nanopores in Anodized Aluminum Oxide via the Layer-by-Layer Deposition of Polyelectrolytes", Langmuir, 2012, pp. 10091-10096, vol. 28.
Ali, M. et al., "Layer-by-Layer Assembly of Polyelectrolytes into Ionic Current Rectifying Solid-State Nanopores: Insights from Theory and Experiment", Journal of American Chemical Society, 2010, pp. 8338-8348, vol. 132.
Armstrong, J. A. et al., "Separation of Ions Using Polyelectrolyte-Modified Nanoporous Track-Etched Membranes", Langmuir, 2013, pp. 10287-10296, vol. 29.
Derocher, J. P. et al., "Layer-by-Layer Assembly of Polyelectrolytes in Nanofluidic Devices", Macromolecules, 2010, pp. 2430-2437, vol. 43.
Kiryukhin, M. V. et al., "Peculiarities of Polyelectrolyte Multilayer Assembly on Patterned Surfaces", Langmuir, 2011, pp. 8430-8436, vol. 27.
Actis, P. et al., "Voltage-Controlled Metal Binding on Polyelectrolyte-Functionalized Nanopores", Langmuir, 2011, pp. 6528-6533, vol. 27.

(Continued)

*Primary Examiner* — Michael Bernshteyn
(74) *Attorney, Agent, or Firm* — Kevin W. Bieg

(57) ABSTRACT

Nanostructured polyelectrolyte bilayers deposited by Layer-by-Layer deposition on nanoporous membranes can be selectively crosslinked to modify the polyelectrolyte charge density and control ionic selectivity independent of ionic conductivity. For example, the polyelectrolyte bilayer can comprise a cationic polymer layer, such as poly(ethyleneimine), and an anionic polymer layer, such as poly(acrylic acid). Increasing the number of bilayers increases the cation selectivity when the poly(ethyleneimine) layer is crosslinked with glutaraldehyde. Crosslinking the membranes also increases the chemical and mechanical strength of the polyelectrolyte films. This controllable and inexpensive method can be used to create ion-selective and mechanically robust membranes on porous supports for a wide range of applications.

18 Claims, 8 Drawing Sheets

(56) References Cited

OTHER PUBLICATIONS

Yuan, W. et al., "Exponentially growing layer-by-layer assembly to fabricate pH-responsive hierarchical nanoporous polymeric film and its superior controlled release performance", Chemical Communication, 2010, pp. 9161-9163, vol. 46.
Cheung, D. T. et al., "Mechanism of Crosslinking of Proteins by Glutaraldehyde I: Reaction with Model Compounds", Connective Tissue Research, 1982, pp. 187-199, vol. 10.
Bax, D. V. et al., "Fundamental insight into the effect of carbodiimide crosslinking on cellular recognition of collagen-based scaffolds", Acta Biomaterialia, 2017, pp. 218-234, vol. 49.
Yang, Y.-H., et al., "Super Gas Barrier of All-Polymer Multilayer Thin Films", Macromolecules, 2011, pp. 1450-1459, vol. 44.

\* cited by examiner

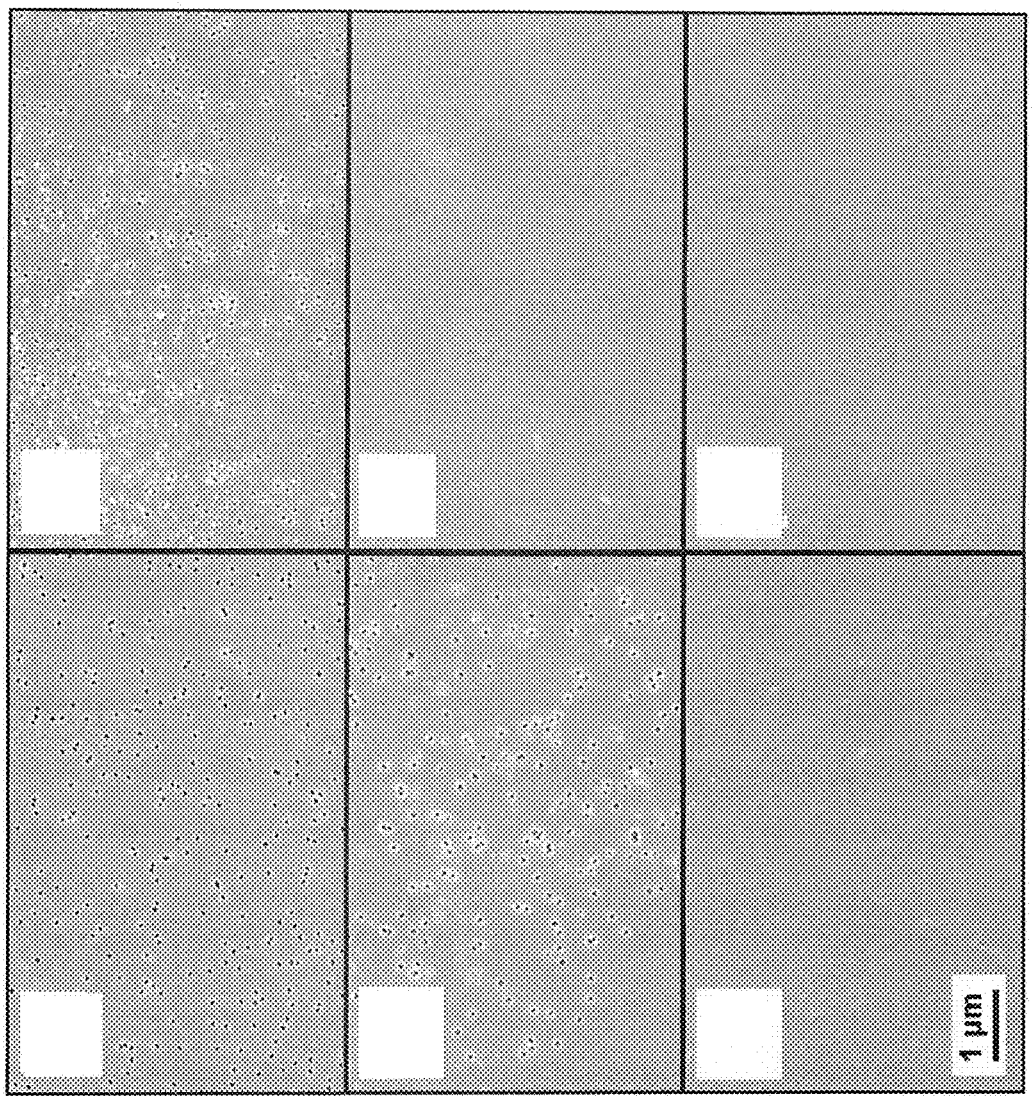

NANOSTRUCTURED POLYELECTROLYTES FOR ION-SELECTIVE MEMBRANES

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to ion-selective membranes and, in particular, to nanostructured polyelectrolytes for ion-selective membranes that can be used in energy storage and electrodialysis applications.

BACKGROUND OF THE INVENTION

Ion-exchange or ion-selective membranes are semi-permeable membranes that transport certain dissolved ions, while blocking other ions or neutral molecules. Such membranes typically comprise an organic or inorganic polymer with charged (ionic) side groups to control ion transport. Ion-selective membranes are often used in electrodialysis, having applications in seawater desalination, industrial wastewater treatment of highly scaling waters, food and beverage production, and other industrial wastewaters. Electrodialysis uses ion-selective membranes to transport salt (MX) or acid from one solution, the diluate, to another solution, the concentrate, by applying an electric current. A convention electrodialysis cell is shown in FIG. 1. The cell comprises a diluate compartment and a concentrate compartment formed by an anion exchange membrane (AEM) and cation exchange membranes (CEM) placed in an electrolyte between two electrodes. The feed or diluate stream, concentrate or brine stream, and electrode (anolyte and catholyte) streams are allowed to flow through the appropriate cell compartments formed by the ion-selective membranes. Under the influence of an electrical potential difference, the negatively charged anions ($X^-$) in the feed or diluate stream migrate toward the positively charged anode. These anions pass through the positively charged AEM, but are prevented from further migration toward the anode by the negatively charged CEM and therefore stay in the concentrate stream, which becomes concentrated with the anions. The positively charged cations ($M^+$) in the feed or diluate stream migrate toward the negatively charged cathode and pass through the negatively charged CEM. Cations in the concentrate stream are prevented from further migration toward the cathode by the positively charged AEM. As a result of the anion and cation migration, electric current flows between the cathode and anode. The overall result of the electrodialysis process is a depletion in the salt content in the diluate compartment and an enrichment in the salt content in the concentrate compartment. In almost all practical electrodialysis processes, multiple electrodialysis cells are arranged into a configuration called an electrodialysis stack, with alternating anion and cation exchange membranes forming the multiple electrodialysis cells.

Ion-selective nanoporous membranes offer a convenient platform with which to control ion transport. See C. R. Martin et al., *Adv. Mater.* 13, 1351 (2001). The relative ratio of pore surface area to electrolyte volume provides an opportunity to tune ion transport through the pore by controlling surface charge on the pore wall. See W. Guo et al., *Chem. Res.* 46, 2834 (2013); and H. Daiguji, *Chem. Soc. Rev.* 39, 901 (2010). In this respect, many groups have successfully leveraged a variety of responsive chemistries to alter the surface charge, and resulting ion transport, through a nanoporous membrane. See J. Elbert et al., *Adv. Funct. Mater.* 24, 1591 (2014); Q. Zhang et al., *Adv. Funct. Mater.* 24, 424 (2014); T. Liu et al., *Chem. Commun.* 49, 10311 (2013); I. Vlassiouk et al., *Nano. Lett.* 6, 1013 (2006); F. Buyukserin et al., *Small* 3, 266 (2007); and L. J. Small et al., *Nanoscale* 7, 16909 (2015). Moreover, different ion transport behavior can be achieved through control of the nanopore shape, for example cones can give rise to different degrees of ion rectifying behaviors normally absent in simple cylindrical nanopores, important factors for overall control of ion transport in the membranes. See P. Apel et al., *Nucl. Instrum. Meth. B* 184, 337 (2001); N. Li et al., *Anal. Chem.* 76, 2025 (2004); L. J. Small et al., *RSC Adv.* 4, 5499 (2014); J. Cervera et al., *J. Chem. Phys.* 124, 104706 (2006); Z. Siwy et al., *J. Am. Chem. Soc.* 126, 10850 (2004); and C. Kubeil and A. Bund, *J. Phys. Chem. C* 115, 7866 (2011).

SUMMARY OF THE INVENTION

The present invention is directed to method to independently control the ionic selectivity and ionic conductivity of nanoporous membranes via Layer-by-Layer deposition of polyelectrolyte bilayers and subsequent selective crosslinking of the polymer layers. As an example, the ion transport properties of nanoporous polycarbonate membranes can be tuned by sequentially dip coating layers of cationic polyethyleneimine and anionic poly(acrylic acid) onto the membranes. The cationic and anionic polymers are self-assembled through electrostatic and hydrogen bonding interactions and can be mechanically stabilized by crosslinking the polymer layers together. Both the thickness of the deposited coating and the use of chemical crosslinking agents can significantly influence charge transport properties. Increased polyelectrolyte thickness can increase the selectivity for ionic transport through the membranes, although adding polyelectrolyte films decreases the overall ionic conductivity compared to an uncoated membrane. However, upon crosslinking a portion of the lost conductivity can be recovered. The crosslinking agent also influences the ionic selectivity of the resulting polyelectrolyte membranes. For example, increased selectivity for cationic transport can be obtained when using glutaraldehyde to selectively crosslink the primary amines in the polyethyleneimine layer, thus decreasing the net positive charge of the polyelectrolyte membrane. The invention can provide mechanically robust, highly conductive, ion-selective membranes on inexpensive porous supports for applications ranging from energy storage via fuel cells or flow batteries, to water purification by electrodialysis.

BRIEF DESCRIPTION OF THE DRAWINGS

The detailed description will refer to the following drawings, wherein like elements are referred to by like numbers.

FIGS. 4A-F show scanning electron microscope (SEM) plan view images of polyelectrolyte-coated membranes. FIG. 4A is an SEM of bare PC. FIG. 4B is an SEM of three bilayers (3BL) not crosslinked. FIG. 4C is an SEM of 3BLs crosslinked with N-(3-dimethylaminopropyl)-N'-ethylcarbodiimide hydrochloride (EDC). FIG. 4D is an SEM of 1 BL crosslinked with glutaraldehyde (GA). FIG. 4E is an SEM of 3 BL GA. FIG. 4F is an SEM of 5 BL GA. All images have the same scale bar.

FIG. 5A is a cross-sectional SEM image of 5BL GA. FIG. 5B is a magnification of the top layer of polyelectrolyte shown in FIG. 5A. The dotted lines denote the interface between the polyelectrolyte and the PC support membrane.

DETAILED DESCRIPTION OF THE INVENTION

Figure 1:
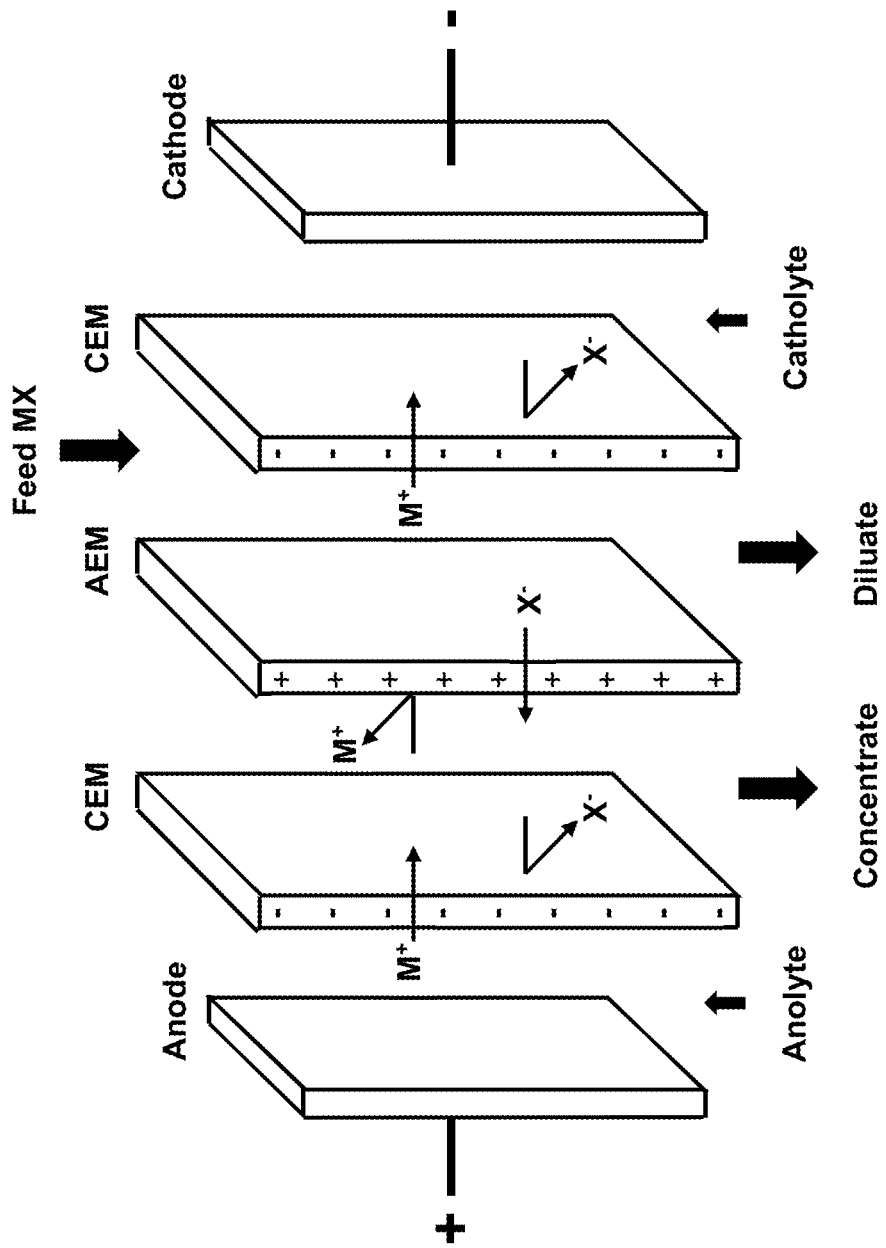
FIG. 1 is a schematic illustration of a convention electrodialysis cell.

For large scale applications, such as water purification or chemical separation, inexpensive membrane manufacturing methods are needed. See M. A. Shannon et al., *Nature* 452, 301 (2008); and J. Noack et al., *Ang. Chem. Int. Ed.* 54, 9776 (2015). According to the present invention, Layer-by-Layer deposition (LbL) of polyelectrolytes provides such a low-cost solution. LbL deposition is a bottom up approach that has been used to create a range of functional materials, including polymer/clay fire retardant coatings, nanoparticle electrocatalysts, and Metal-Organic Frameworks (MOFs). See K. Holder et al., *J. Mater. Sci.* 52, 12923 (2017); T. Guin et al., *Adv. Mater. Interfaces* 2, 1500214 (2015); C. Han et al., *Langmuir* 32, 8783 (2016); M. Yaqub et al., *ACS Appl. Mater. Interfaces* 7, 1046 (2015); D. Y. Lee et al., *RSC Adv.* 4, 12037 (2014); E. D. Spoerke et al., *J. Phys. Chem. C* 121, 4816 (2017); and A. L. Robinson et al., *Anal. Chem.* 84, 7043 (2012). Polyelectrolytes are polymers whose repeating units comprise an electrolyte group, either a cationic group or an anionic group. In its simplest form, the invention comprises a polyelectrolyte consisting of an anionic polymer layer and a cationic polymer layer which are sequentially deposited on a substrate, forming one "bilayer" (BL). Additional BLs can be built up by LbL deposition to provide polyelectrolyte multilayers. Solutions of inexpensive polymers can be used and substrates can be simply LbL dip coated to form the polyelectrolyte films. See D. A. Hagen et al., *ACS Macro Lett.* 3, 663 (2014); and C. Cho et al., *Macromolecules* 48, 5723 (2015). During each dip a small amount of polyelectrolyte is adsorbed and the surface charge is reversed, allowing the gradual and controlled build-up of electrostatically bonded films of polycation-polyanion bilayers.

A variety of substrates have been used for polyelectrolyte fabrication, including anodic alumina, mesoporous silica, inverse opal structures, quartz nanopipettes, and ion-tracked polymeric membranes, among others. See M. Raoufi et al., *Langmuir* 28, 10091 (2012); T. D. Lazzara et al., *ACS Nano* 4, 3909 (2010); A. Brunsen et al., *Langmuir* 27, 4328 (2011); S. J. Yeo et al., *ACS Appl. Mater. Interfaces* 4, 2107 (2012); P. Actis et al., *Langmuir* 27, 6528 (2011); M. Ali et al., *J. Amer. Chem. Soc.* 132, 8338 (2010); J. A. Armstrong et al., *Langmuir* 29, 10287 (2013); H. Chen et al., *Chem. Mater.* 18, 4875 (2006); H. Alem et al., *Macromolecules* 40, 3366 (2007); Y. Zao et al., *Langmuir* 33, 3484 (2017); and C. J. Roy et al., *Langmuir* 26, 3350 (2010). For example, ion-tracked polycarbonate or polyester substrates (e.g., polyethylene terephthalate) can conveniently be used with the invention. Indeed, almost any nanoporous substrate that has a surface charge and won't dissolve in the electrolyte can be used with the invention, including non-woven or dry-stretch type membranes, cellulose, acetates, polyesters, polyamides, and metals. The intrinsic surface charge found on most substrates allows for direct dip coating without extensive surface preparation, though some groups have specially prepared surfaces, often amine-terminated. See M. Raoufi et al., *Langmuir* 28, 10091 (2012); H. Chen et al., *Chem. Mater.* 18, 4875 (2006); M. Ali et al., *Nanotechnology* 19, 085713 (2008); and V. VanDelinder et al., *ACS Appl. Mater. Inter.* 7, 5643 (2015). As BLs are added to a planar surface, film thickness can grow exponentially or linearly depending on deposition conditions. See W. Yuan and C. M. Li, *Chem. Commun.* 46, 9161 (2010); D. A. Hagen et al., *ACS Macro Lett.* 3, 663 (2014); and Y.-H. Yang et al., *Macromolecules* 44, 1450 (2011). Polyelectrolyte film growth on a nanoporous surface, however, is more complex, with formation of a dense gel in the nanopore governed by pore size, ionic strength, and the specific chemistry and molecular weight polymer used. See H. Alem et al., *Macromolecules* 40, 3366 (2007); C. J. Roy et al., *Langmuir* 26, 3350 (2010); and J.-M. Y. Carrillo and A. V. Dobrynin, *Langmuir* 28, 1531 (2012).

Commonly, polymers containing either amines or sulfonate groups are used as cooperative elements to form the self-assembled polyelectrolyte BLs. See M. Raoufi et al., *Langmuir* 28, 10091 (2012); M. Ali et al., *J. Amer. Chem. Soc.* 132, 8338 (2010); J. A. Armstrong et al., *Langmuir* 29, 10287 (2013); J. P. DeRocher et al., *Macromolecules* 43, 2430 (2010); and M. V. Kiryukhin et al., *Langmuir* 27, 8430 (2010). The positive charge of the amine complemented by the negative charge of the sulfonate enables LbL assembly via electrostatic and hydrogen bonding attractions. Less commonly used are anionic polymers containing carboxylic acids. See P. Actis et al., *Langmuir* 27, 6528 (2011); W. Yuan and C. M. Li, *Chem. Commun.* 46, 9161 (2010); and M. V. Kiryukhin et al., *Langmuir* 27, 8430 (2010).

The present invention not only exploits the electrostatic interactions of polyelectrolyte bilayers to facilitate the LbL assembly, but also takes advantage of the fact that these moieties can be chemically crosslinked or charge-neutralized to modify the properties and functionalities of the polyelectrolyte coatings. Crosslinkers comprise at least two reactive groups (e.g., bifunctional), which target and form chemical bonds with common functional groups found on polyelectrolytes. For example, carboxylic acids present opportunities for a range of crosslinking options, including carboxylic acid-amine coupling to form amide bonds, or amine-to-amine crosslinking. For example, carboxylic acids can be crosslinked to amines using carbodiimide crosslinkers to form amide bonds. A variety of amine-reactive crosslinkers can be used to form amine-to-amine crosslinks, including homo- and hetero-, bifunctional- and trifunctional-crosslinking agents. Further, carboxylate-reactive agents, such as diazoalkanes, diazoacetyl, carbonyldiimidizole, and carbodiimides can be reacted with carboxylates to form neutral complexes. These crosslinking and charge-neutralizing chemistries can influence both the ionic selectivity and ionic conductivity through nanoporous membranes, enabling further refinement of ionic transport properties for targeted applications.

However, the invention is not limited to cationic polymers comprising primary amines and anionic polymers comprising carboxylic acids. For example, cationic polymers comprising other amine-functional groups, such as quaternary amines, and anionic polymers comprising sulfonate groups can also be used. Polyelectrolytes soluble in both water and organic solvents can be used.

Many biological molecules are polyelectrolytes. Therefore, for some applications, small biomolecules such as amino acids or peptides can be added to either or both of the cationic polymer and/or anionic polymer during LbL assembly. These include, but are not limited to, the 20 naturally occurring amino acids, amines, carboxylic acids, phenyl groups, hydroxyls, thiols, alkyls, and ethylene oxides. These biomolecules can be crosslinked using known bioconjugation strategies.

Example: LbL Deposition of Bilayer PAA and PEI Polyelectrolytes

As an example of the invention, LbL deposition was used to create nanoporous polymer membranes coated with bilayer polyelectrolytes of poly(acrylic acid) (PAA) and poly(ethyleneimine) (PEI). Below is described the polyelectrolyte film assembly and how ionic selectivity, ionic conductivity, and mechanical integrity can be further tuned by the choice of crosslinking agent and the influence it has on overall charge in the polyelectrolyte film.

Figure 2:
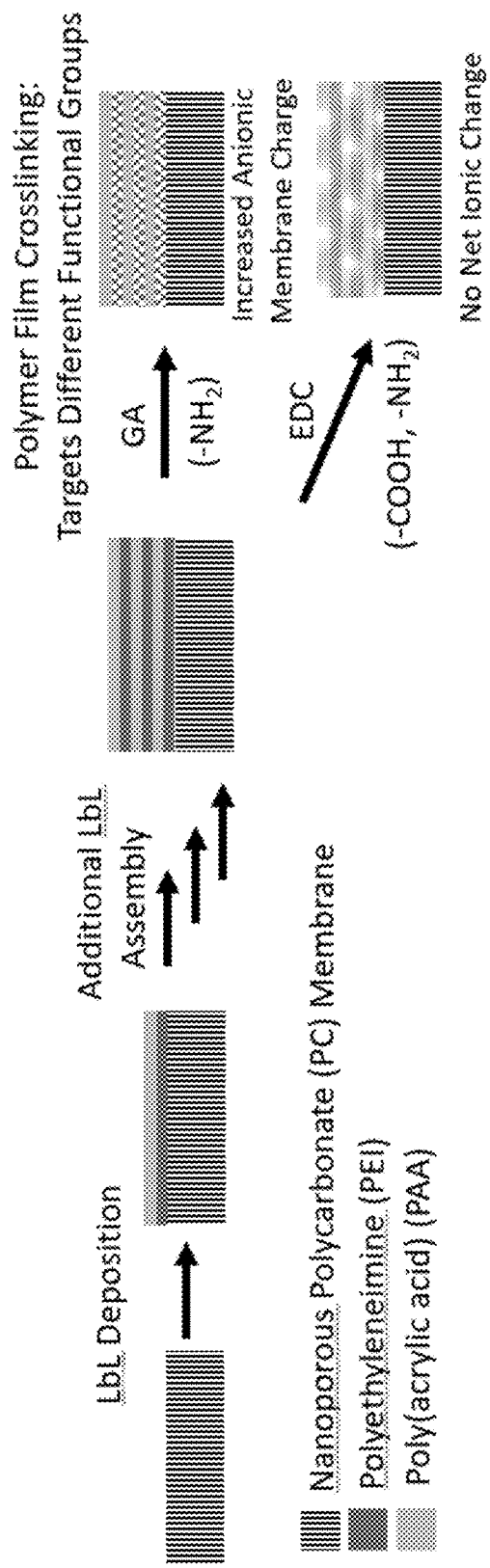
FIG. 2 is a schematic illustration of an exemplary Layer-by-Layer (LbL) deposition process wherein polymer layers are sequentially deposited onto a nanoporous membrane and subsequently crosslinked with crosslinking agents targeting different functional groups.

The LbL deposition of the polyelectrolyte thin films was accomplished by dip coating a nanoporous polycarbonate (PC) membrane in aqueous solutions containing the dissolved polymer constituents. FIG. 2 shows a schematic illustration of the LbL deposition process where the nanostructured polyelectrolyte layers of PEI and PAA are built up one layer at a time. In this example, after the desired number of BLs are deposited, the polymers can be crosslinked using glutaraldehyde (GA) or N-(3-dimethylaminopropyl)-N'-ethylcarbodiimide hydrochloride (EDC) to further tune the charge density and to increase the mechanical stability of the polyelectrolyte. GA is known to crosslink primary amines, thus decreasing the amount of cationic fixed charge in the membrane. See D. T. Cheung and M. E. Nimni, *Connect. Tissue Res.* 10, 187 (1982). Other water-soluble amine-reactive crosslinkers, such as bis(sulfosuccinimidyl)suberate, can also be used. EDC, on the other hand, links primary amines to carboxylic acids, decreasing both the cationic and anionic fixed charge by the same amount. See D. V. Bax et al., *Acta Biomater.* 49, 218 (2017). Other carbodiimide crosslinkers that are soluble in water can also be used. To best understand how the film thickness and crosslinking influence the resulting film morphology, ionic conductivity, and ionic selectivity, a series of membranes were synthesized. Membranes with either 1, 3, or 5 BLs were dip coated and crosslinked with GA, and are hereafter referred to as "1 BL GA," "3BL GA," and "5BL GA." Similarly, membranes were synthesized with 3BL but not crosslinked, hereafter referred to as "3BL Not X-linked," or with 3BL and EDC crosslinked, hereafter referred to as "3BL EDC."

As an example of the membrane fabrication process, track-etched nanoporous PC support membranes (0.05 μm pore, 90 mm, Sterlitech Corporation) were first treated to remove a thin unwanted polyvinyl pyrrolidone (PVP) layer. The membranes were then etched in a 4.5 M sodium hydroxide (NaOH) solution for 5 minutes, followed by rinsing in deionized (DI) water (18.2 MΩ*cm). The membranes were then treated with UV-ozone for 10 minutes on each side. Immediately thereafter, the membranes were immersed in a 0.1 wt % PEI (branched, average $M_w$=~25,000) solution (pH=10.4) for 5 minutes, rinsed in DI water, and then immersed in a 0.2 wt % PAA (average $M_w$=~100,000) solution (pH=3.2) for 5 minutes. This process constituted the $1^{st}$ bi-layer (BL) of the LbL assembly process. Additional BLs were then assembled by sequentially dipping in the polymer solutions for only 1 minute each. The self-assembled polyelectrolyte BLs were then tested as made or crosslinked with either GA or EDC. The GA crosslinked membranes were immersed in a 25% GA in water solution for 12 hours (overnight) and then washed with copious amounts of DI water. The EDC crosslinked membranes were immersed in a 100 mM EDC solution in water for 12 hours (overnight) and then washed with copious amounts of DI water. From these 90 mm diameter membranes (64 cm$^2$ in area), daughter membranes 20 mm in diameter were punched out for all subsequent testing.

Figure 3A:
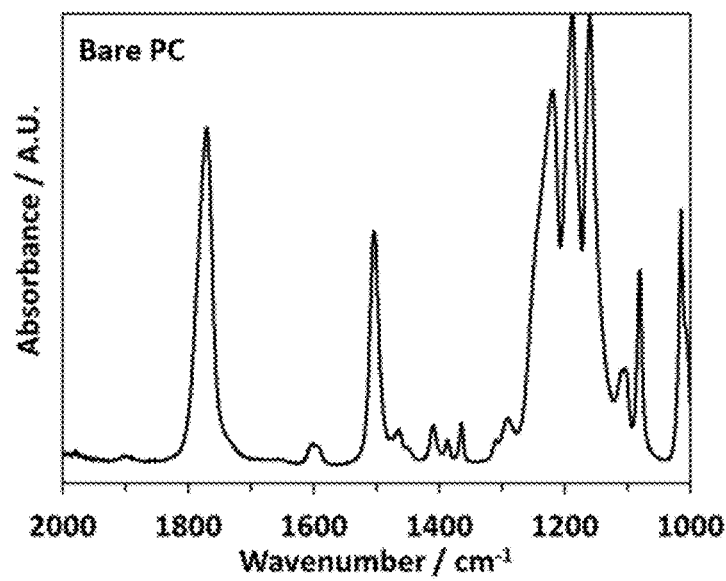
FIG. 3A is an Fourier Transform Infrared (FTIR) spectrum of a bare polycarbonate (PC) membrane.

FTIR absorbance was used to verify deposition of the polyelectrolyte layers and the efficacy of crosslinking. FTIR spectra were recorded for all samples, as made and after crosslinking, and are plotted in FIGS. 3A-C. As shown in FIG. 3A, the bare PC spectrum reveals the peaks characteristic to the carbonate C=O stretch at 1769 cm$^{-1}$, C—H bend at 1502 cm$^{-1}$, and multiple bands around 1216-1157 cm$^{-1}$ corresponding to the ether C—O stretches. Upon coating the PC support with polyelectrolyte, the peaks associated with the PC support membrane decrease in intensity while two main peaks of interest appear, labeled "C=O" and "N—H" in FIGS. 3B and 3C. These two peaks are assigned to the carboxylic acid C=O stretch in PAA at 1714 cm$^{-1}$ and the N—H bend from PEI at 1550 cm$^{-1}$.

Figure 3B:
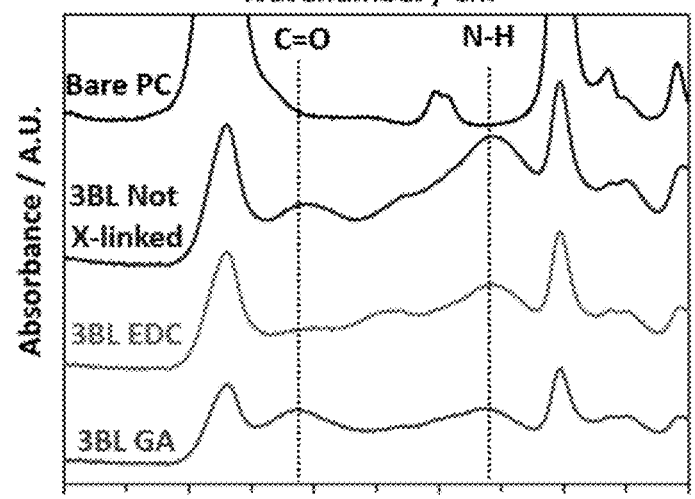
FIG. 3B shows FTIR spectra of polyelectrolytes on PC membranes showing the effect of crosslinking agent.

The degree of crosslinking can be observed from the FTIR spectra. In FIG. 3B, the FTIR spectra for the 3BL Not X-linked sample shows the "N—H" peak has a larger absorbance than the "C=O" peak. Upon crosslinking with EDC, the "N—H" and "C=O" absorbance peaks decrease in intensity but the decrease is similar between the two peaks, indicating that the EDC has lowered the number of amine and carboxylic acid functional groups in the polyelectrolyte by equal amounts. However, the 3BL GA crosslinked spectra shows the "N—H" peak has decreased substantially relative to the "C=O" peak, indicating a very large decrease in the number of amine groups in the polyelectrolyte. This shows the crosslinking was effective in changing the relative ratios of the functional groups, thus changing the resulting charge density present in the polyelectrolyte.

Figure 3C:
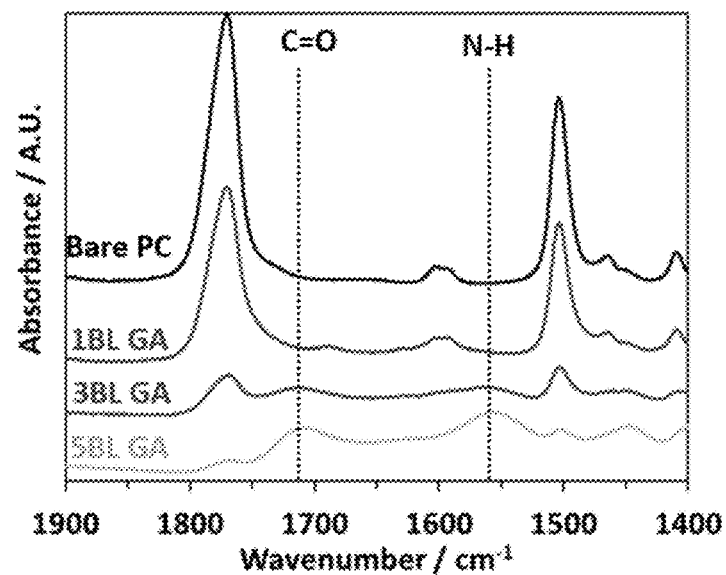
FIG. 3C shows FTIR spectra of polyelectrolyte on PC membranes showing the effect of increasing number of polyelectrolyte bilayers. The positions of the carboxylic acid C=O stretch and the primary amine N—H bend are shown with the dotted lines in each.

FIG. 3C shows how the two peaks associated with the layered polyelectrolyte increase in intensity with respect to the PC peaks as the number of BLs increases, with GA crosslinking. The peak associated with the "N—H" peak continues to increase with increased BL deposition. This indicates that the amines in the polyelectrolyte have not been fully removed during crosslinking. This is most likely because the crosslinking reaction requires the amines to be in close physical proximity to each other and that there are some that cannot be crosslinked effectively due to the randomized locations of the functional groups in the film upon deposition.

If any pores are not coated with polyelectrolyte the resulting properties of the membrane will be affected. As such a uniform coating of polyelectrolyte is important for improving the membrane's ionic selectivity and was only achieved using both crosslinking and film thicknesses of at least 3BL. Plan view and cross-sectional SEM images were taken to determine relative uniformity and thickness of the self-assembled polymers layers. FIGS. 4B-F show the resulting topologies of each membrane type with the bare PC membrane shown for comparison in FIG. 4A. FIGS. 4B and 4C show 3BL Not X-linked and 3BL EDC, respectively. 3BL Not X-linked shows evidence that the polymer was only loosely bound to the support membrane and slowly has either diffused along the membrane surface or re-dissolved, uncovering large portions of the membrane and exposing the nanopores. However, the images of 3BL EDC do not show exposed nanopores and the film looks smooth and uniform, confirming that crosslinking of the polyelectrolytes is imperative for overall film adhesion and mechanical stability.

FIGS. 4D-F show plan view images of 1BL GA, 3BL GA, and 5BL GA, respectively. 1BL GA still has many of the nanopores exposed, but the polymer coating is already starting to fill the pores and coat the surface. By 3 BLs the pores are completely covered and the film is largely uniform. By 5 BLs the membrane appears to be the smoothest and most uniform, even macroscopically. Thus, it is concluded that films at least 3BL thick are necessary to completely cover the nanopores, in addition to chemical crosslinking necessary for polyelectrolyte film adhesion.

Figure 5A:
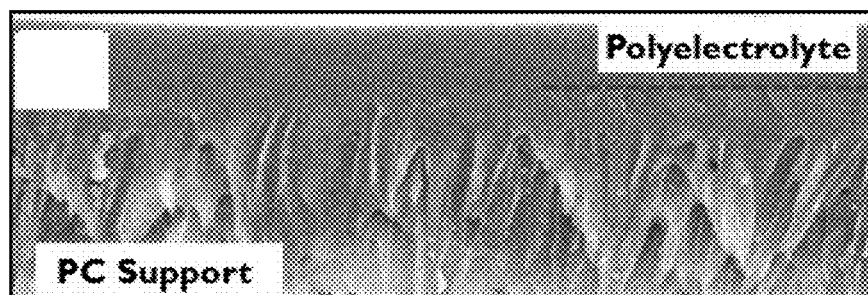
FIGS. 5A and 5B show cross-sectional SEM images of some membranes used to calculate the thickness of the coated polyelectrolyte layers.
Figure 5B:
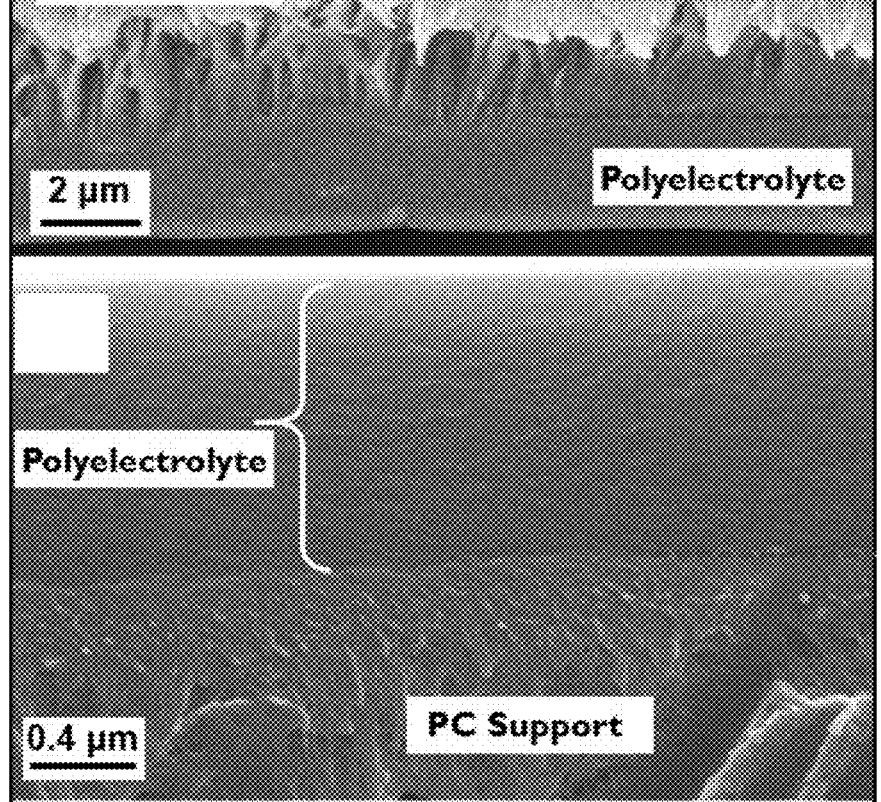
Figure 5C:
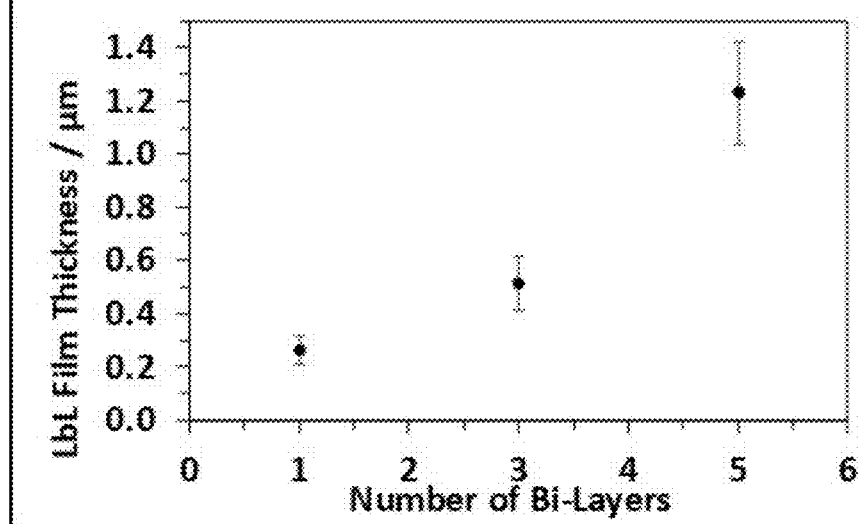
FIG. 5C is a plot of the measured thicknesses of the polyelectrolyte layers. Error bars in this figure represent one standard deviation.

To gain further understanding of the self-assembled polyelectrolyte coating structure and thickness, cross-sectional analysis was performed. FIGS. 5A and 5B show the cross section of a 5BL GA crosslinked sample. The cross section in FIG. 5A shows the PC membrane in the middle sandwiched between the two layers of polyelectrolyte, resulting from the coating of both sides of the PC membrane. In FIG. 5B the interface between the PC support membrane and the self-assembled polyelectrolyte which suggests coherent interaction between the two polymers. A plot of the thicknesses of the deposited polyelectrolyte is shown in FIG. 5C. As the number of bilayers increases the thickness increased. Measuring the thickness of the polyelectrolyte on the PC membrane at different points and determined the thickness of the 5BL GA membrane to be ~1230±193 nm, on average. Similar thickness results were seen from previous reports where thick polymer films resulted with PEI and PAA solutions. See Y.-H. Yang et al., *Macromolecules* 44, 1450 (2011).

Figure 6A:
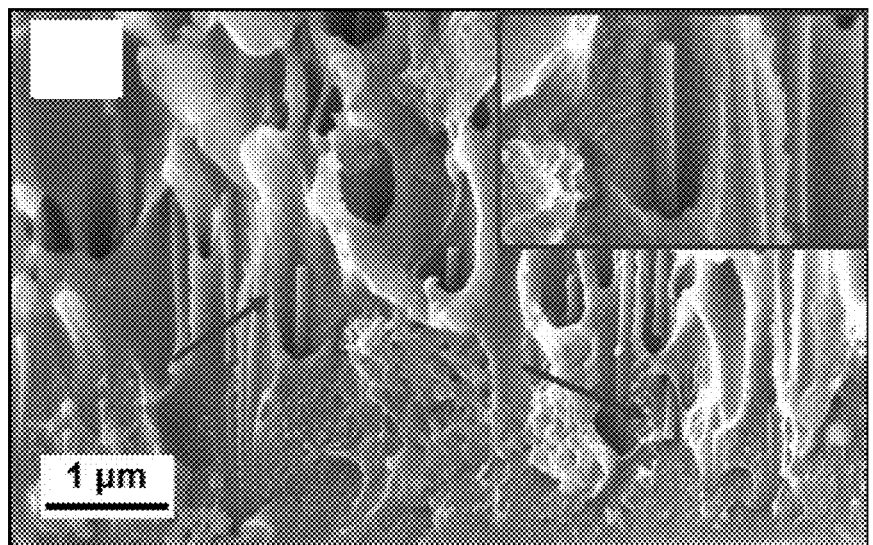
FIGS. 6A and 6B show cross sectional SEM images of 3BL GA membranes showing filled pores where the polyelectrolyte is forming "nanowire" like structures coming out of the PC membrane. Arrows in FIG. 6A point to the emergence of the polyelectrolyte "nanowire" (magnified view shown in corresponding inset). The arrow in FIG. 6B points to the remnants of filled nanopores where some are pulled apart and appear hollow (magnified view shown in corresponding inset).
Figure 6B:
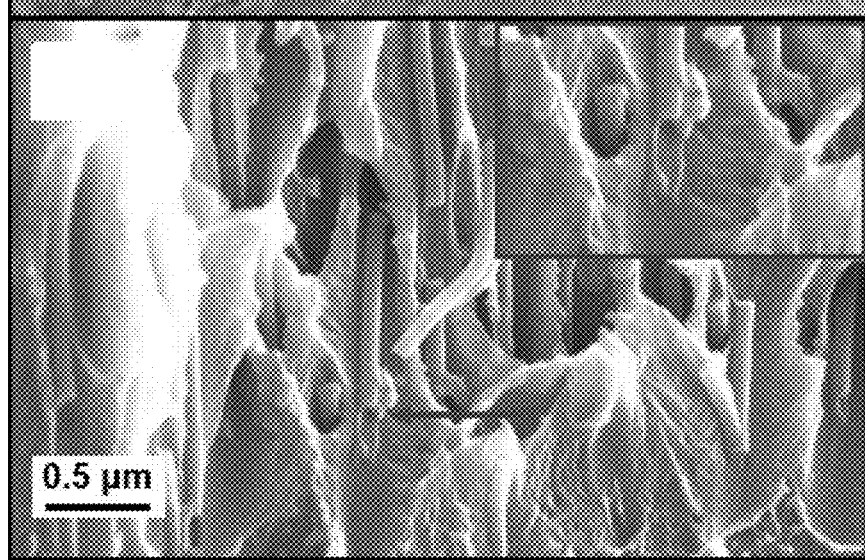

Additional cross-sectional SEM images of a coated membrane are shown in FIGS. 6A and 6B. This membrane was coated with a 3BL GA crosslinked polyelectrolyte film and there is clear evidence of the polyelectrolyte filling the PC nanopores. FIG. 6A shows many of the now exposed pore interiors with a "wire" or "rod" like structure protruding from the inside of the membrane. These structures were not visible in the bare PC and 1BL GA (not shown), which did not have any obvious filling in the pores, although 1BL GA had what looked like some tube formation inside the pores. Some evidence for tubular structures was observed in the SEM images. FIG. 6B shows a pore filling structure that was ripped open by the freeze-fracture process and appears largely hollow on the inside. The concentric filling of the pores forming hollow tubes that then completely fill upon more additional BL dip coatings is likely but unconfirmed.

Figure 7A:
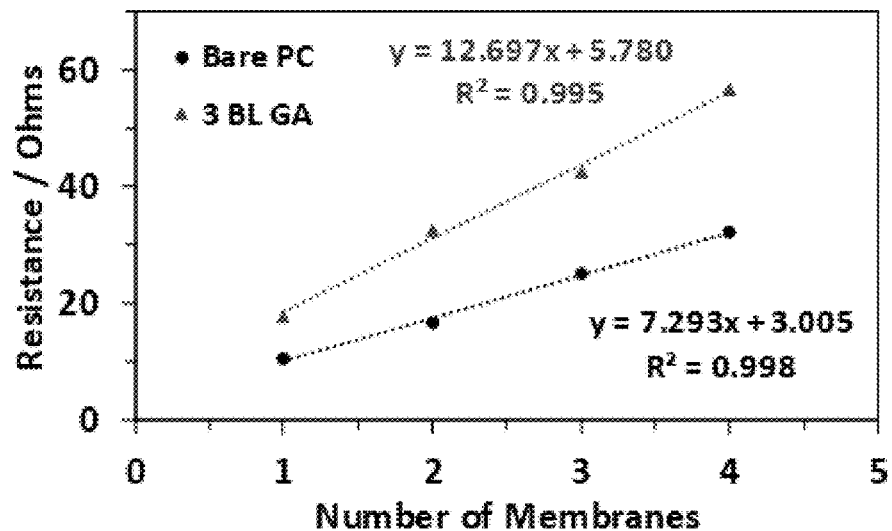
FIG. 7A is a plot of increasing resistance with the number of membranes in a stack, data for both samples collected in 10 mM NaCl solution.
Figure 7B:
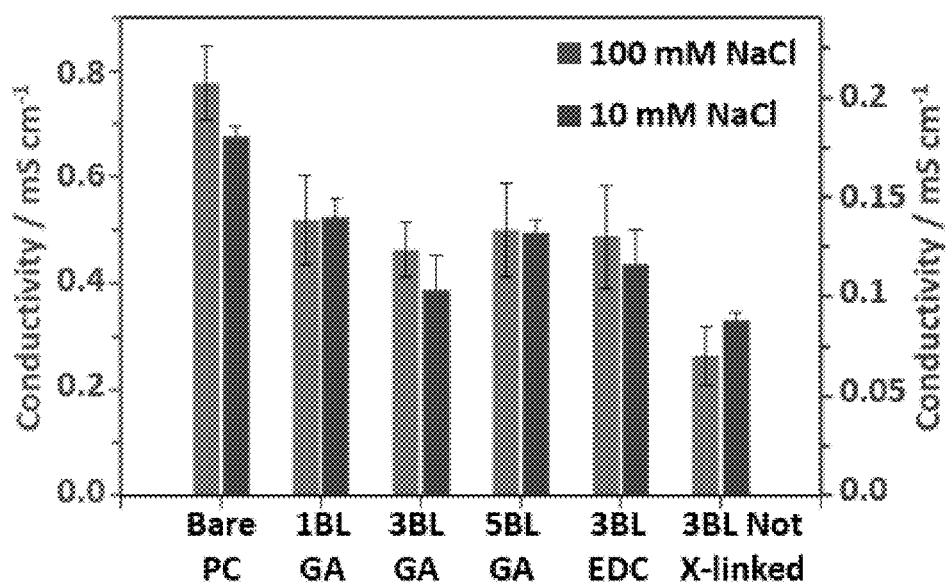
FIG. 7B is a plot of the calculated conductivity of the membranes in both 10 mM NaCl and 100 mM NaCl solutions determined from the slopes of the resistance vs. number of membrane plots seen in FIG. 7A. The conductivities from the 100 mM NaCl solution pertain to the left axis and the conductivities from the 10 mM NaCl solution pertain to the right axis.

To investigate how the resulting conductivity of the membranes is impacted by the coating, the total resistance of stacks of membranes cut from the same mother membrane was measured. Membrane conductivity was evaluated using a previously described procedure wherein stacks of membranes are sequentially measured using electrochemical impedance spectroscopy (EIS). See N. S. Hudak et al., *J. Electrochem. Soc.* 162, A2188 (2015). FIG. 7A shows two example plots of the total resistance vs. number of membranes stacked together for the bare PC and the 3 BL GA crosslinked membranes in 10 mM NaCl solution. The membranes were stacked and measured to obtain an average resistance per membrane, thereby eliminating contributions to resistance from the cables and fixturing. From the plots, the average resistivity of a membrane (then converted into conductivity) can be calculated from the slope of the best fit line. FIG. 7B shows the calculated conductivities of all the different membranes types in both 10 mM NaCl and 100 mM NaCl. The relative changes in the conductivities between different types of membranes are the same in both NaCl concentration solutions. The bare PC membranes had the highest conductivity, as expected, due to the fact that there is no polyelectrolyte obscuring the transmembrane pores. Once the $1^{st}$ bilayer is applied (1BL GA) the conductivity drops but no additional significant decrease is observed with additional coating. Additionally, the choice of crosslinking agent used does not affect the resulting conductivity; EDC crosslinked membranes have conductivities similar to GA crosslinked membranes. However, not crosslinking the membranes, 3BL Not X-linked, results in the lowest conductivities out of all of the membranes.

Figure 8A:
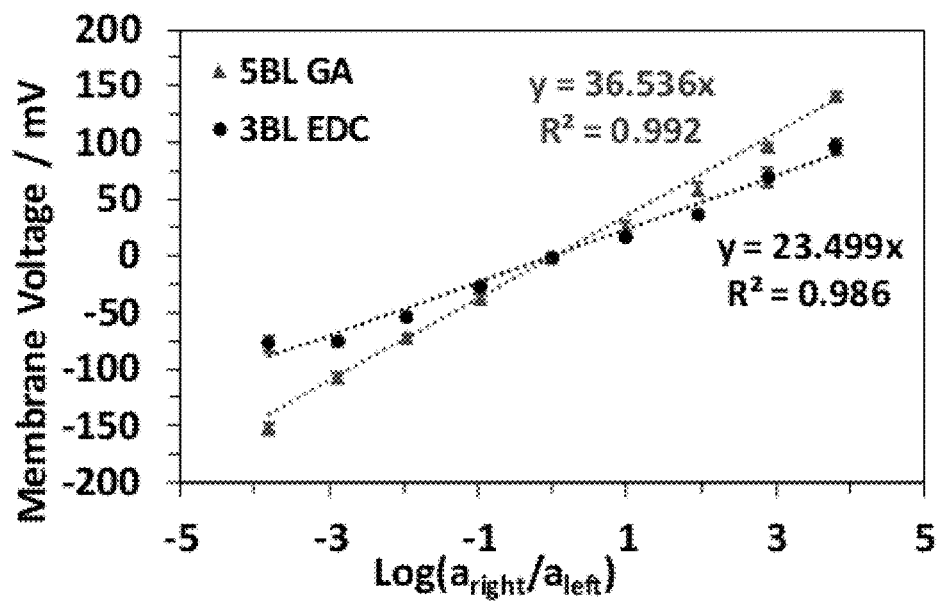
FIG. 8A is a plot of measured membrane voltage curves resulting from the selective flow of ions through the membrane. The example curves shown are the 5 BL GA crosslinked membrane and the 3 BL EDC crosslinked membrane to highlight the difference between a more cation selective membrane and a less cation selective membrane.

Ionic selectivity measurements were performed following a potentiometric method described in depth elsewhere. See L. J. Small et al., *Nanoscale* 7, 16909 (2015). The influence of the polyelectrolyte layers on the ionic selectivity was determined from the resulting transmembrane voltage. This transmembrane voltage arises when two different concentrations NaCl solutions are placed on opposite sides of the membrane and the diffusion of one type of ion is limited with respect to the other. The plots are linear with a positive slope, indicating a preferred cationic selective transport. The slope of the lines can be used to calculate the ion transference capability, or transference numbers. The membrane voltage, $V_m$, for a 1:1 monovalent salt can be described by a modified version of the Nernst equation shown in equation 1.

$$V_m = 0.059(t_+ - t_-)\log\frac{a_{right}}{a_{left}} \quad (1)$$

where $a_{right}$ and $a_{left}$ are the activities of the NaCl salt solutions placed in the right and left side of the U-cell used to measure the transmembrane voltage. See C. R. Martin et al., *Adv. Mater.* 13, 1351 (2001); and L. J. Small et al., *Nanoscale* 7, 16909 (2015). The NaCl concentrations were converted to activities using the well documented activity coefficients. See *CRC Handbook of Chemistry and Physics*, 86th ed.; Lide, D. R., Ed.; CRC Press: Boca Raton, Fla., 2005. The cation and anion transference numbers, $t_+$ and $t_-$, can have values between 0 and 1 and relate the membrane's ability to selectively transport either cations or anions. A perfectly cation selective membrane would have a $t_+=1$ and $t_-=0$, while for a perfectly anion selective membrane $t_+=0$ and $t_-=1$. Therefore, $t_+=1$ and $t_-=0$ would yield a slope of 0.059 V, while $t_+=t_-=0.5$ ($t_++t_-=1$, by definition) would yield a slope of 0, meaning the membrane has no ionic selectivity at all, since both cations and anions could diffuse through the membrane with equal currents. Negative slope would indicate anion selectivity. FIG. 8A shows example plots of the membrane voltage as a log function of the ratio of solution activities. The plots shown highlight the different slopes observed for the polyelectrolyte membranes where the 5 BL GA crosslinked membranes showed the largest slope of 36.54 mV (indicating good cationic selectivity) and the 3 BL EDC crosslinked membranes show a much lower slope of 23.50 mV.

Figure 8B:
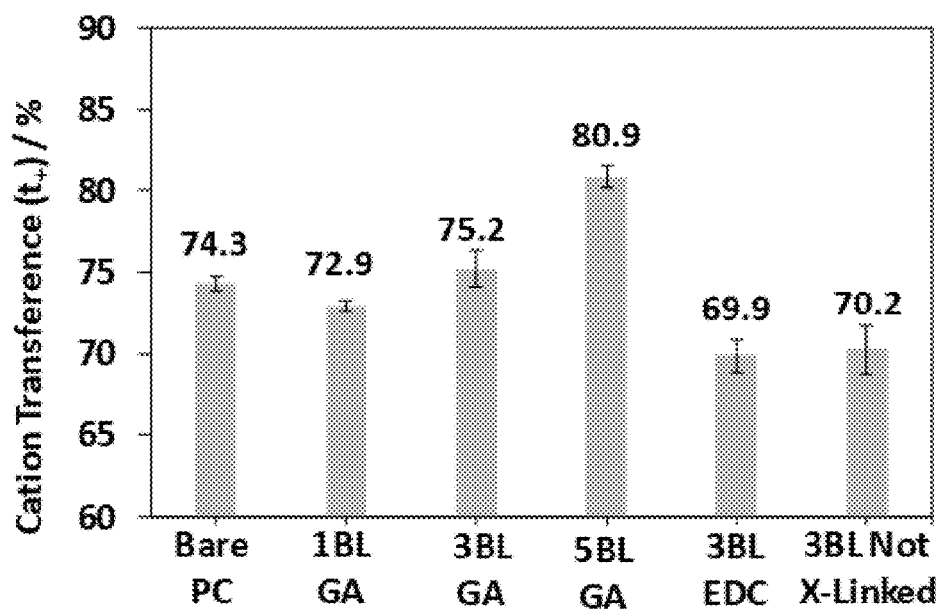
FIG. 8B is a plot of the resulting cation transference numbers calculated from the slopes of the best fit lines in FIG. 8A for the different membranes. Error bars represent one standard deviation for both plots.

All the membranes tested turned out to be selective for cationic transport, but the number of deposited BLs and crosslinking type clearly influence the magnitude of the selectivity. FIG. 8B shows the results of the ionic selectivity measurements where the cation transference number, $t_+$, was calculated from the slopes of the transmembrane voltage curves and are shown in Table 1. As expected, the bare PC membrane was selective for cation transport due to the anionic (COO$^-$) surface charges on the entire membrane surface and pore walls. Surprisingly the 1BL GA was less selective than the bare PC, but this quickly changed as the polyelectrolyte layers became thicker. Cation transference numbers increased by 11% as the number of GA crosslinked BLs increased from 1 to 5.

When comparing the membrane crosslinking types, there is an obvious increase in selective cation transport for the GA crosslinked membranes. This is expected since the glutaraldehyde crosslinking chemistry selectively reacts with primary amines of the PEI polymer layers and does not react with the carboxylic acid groups of the PAA. This shifts the net fixed charge of the polyelectrolyte more negatively, increasing the preference for cations diffusing through the polyelectrolyte. Further evidence of this is seen by comparing the selectivity of the 3BL EDC crosslinked membranes and the as made 3 BL not crosslinked membranes. The selectivity of these membranes is nearly identical, which is rationalized by the fact the EDC crosslinks a primary amine and carboxylic acid, causing no net change in the charge of the polyelectrolyte.

The present invention has been described as nanostructured polyelectrolytes for ion-selective membranes. It will be understood that the above description is merely illustrative of the applications of the principles of the present invention, the scope of which is to be determined by the claims viewed in light of the specification. Other variants and modifications of the invention will be apparent to those of skill in the art.

TABLE 1

Calculated polyelectrolyte membrane transference membrane cation transference numbers taken from the slope of the membrane potential curves in FIG. 8A. The number of samples tested for each membrane is 4.

| membrane | slope of line | $(t_+ - t_-)/\%$ | $t_+/\%$ |
| --- | --- | --- | --- |
| bare PC | 28.7 ± 0.527 | 48.5 ± 0.89 | 74.3 ± 0.44 |
| 1BL GA | 27.1 ± 0.341 | 45.9 ± 0.57 | 72.9 ± 0.28 |
| 3BL GA | 29.8 ± 1.30 | 50.4 ± 2.22 | 75.2 ± 1.10 |
| 5BL GA | 36.5 ± 0.827 | 61.8 ± 1.40 | 80.9 ± 0.70 |
| 3BL EDC | 23.5 ± 1.19 | 39.7 ± 2.01 | 69.9 ± 1.01 |
| 3BL not crosslinked | 23.9 ± 1.74 | 48.7 ± 2.94 | 70.2 ± 1.47 |

We claim:

1. A method to fabricate an ion-selective membrane, comprising the steps of:
    providing a nanoporous membrane; and
    layer-by-layer depositing at least one polyelectrolyte bilayer on at least one side of the nanoporous membrane, wherein the polyelectrolyte bilayer comprises a cationic polymer layer and an anionic polymer layer; and either
    chemically crosslinking or charge-neutralizing the cationic polymer, thereby decreasing a cationic fixed charge in the polyelectrolyte bilayer; or
    chemically crosslinking or charge-neutralizing the anionic polymer, thereby decreasing an anionic fixed charge in the polyelectrolyte bilayer; or
    chemically crosslinking the cationic polymer with the anionic polymer, thereby decreasing both a cationic fixed charge and an anionic fixed charge in the polyelectrolyte bilayer.

2. The method of claim 1, wherein the cationic polymer comprises an amine group.

3. The method of claim 2, wherein the amine group comprises a primary or quaternary amine group.

4. The method of claim 2, wherein the chemically crosslinking comprises crosslinking the amine groups of the cationic polymer with an amine-reactive crosslinker to form amine-to-amine bonds.

5. The method of claim 1, wherein the anionic polymer comprises a carboxylic acid group or sulfonate group.

6. The method of claim 5, further comprising charge-neutralizing the carboxylic acid groups of the anionic polymer with carboxylate-reactive agent.

7. The method of claim 1, wherein the cationic polymer comprises an amine group and the anionic polymer comprises a carboxylic acid group.

8. The method of claim 7, wherein the chemically crosslinking comprises crosslinking the amine groups of the cationic polymer with the carboxylic acid groups of the anionic polymer to form amide bonds.

9. The method of claim 8, wherein the amine groups of the cationic polymer are chemically crosslinked with the carboxylic acid groups of the anionic polymer with a carbodiimide crosslinker.

10. The method of claim 7, wherein cationic polymer comprises poly(ethyleneimine) and the anionic polymer comprises poly(acrylic acid).

11. The method of claim 10, wherein the chemically crosslinking comprises crosslinking the amine groups of the poly(ethyleneimine), thereby decreasing a cationic fixed charge in the polyelectrolyte bilayer.

12. The method of claim 11, wherein the poly(ethyleneimine) is crosslinked with glutaraldehyde.

13. The method of claim 10, further comprising wherein the chemically crosslinking comprises crosslinking amine groups of the poly(ethyleneimine) with carboxylic acid groups of the poly(acrylic acid).

14. The method of claim 13, wherein the poly(ethyleneimine) and the poly(acrylic acid) are crosslinked with N-(3-dimethylaminopropyl)-N'-ethylcarbodimide hydrochloride.

15. The method of claim 1, where the at least polyelectrolyte bilayer comprises at least three polyelectrolyte bilayers.

16. The method of claim 1, wherein the layer-by-layer depositing step comprises sequential dip coating of the cationic polymer layer and the anionic polymer layer.

17. The method of claim 1, wherein the cationic polymer or anionic polymer or both further comprises at least one biomolecule.

18. The method of claim 17, wherein the at least one biomolecule comprises an amino acid or peptide.

* * * * *